United States Patent
Utaki et al.

(10) Patent No.: US 7,971,833 B2
(45) Date of Patent: Jul. 5, 2011

(54) CABLE PROTECTION AND GUIDE DEVICE

(75) Inventors: Akihiko Utaki, Osaka (JP); Katsuhide Yamashita, Osaka (JP); Masaaki Ikeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 733 days.

(21) Appl. No.: 12/016,832

(22) Filed: Jan. 18, 2008

(65) Prior Publication Data

US 2008/0265105 A1     Oct. 30, 2008

(30) Foreign Application Priority Data

Apr. 27, 2007 (JP) ................. 2007-119295

(51) Int. Cl.
  *F16L 3/00* (2006.01)
  *F16B 19/00* (2006.01)
(52) U.S. Cl. ............ 248/49; 248/65; 411/352; 411/360; 59/78.1
(58) Field of Classification Search .......... 248/49, 248/53, 58, 65, 73, 74.1, 51; 59/78.1, 900; 411/369, 353, 337, 11, 544, 999, 32–34, 411/354, 360, 366.1, 367, 541, 546
  See application file for complete search history.

(56) References Cited

U.S. PATENT DOCUMENTS

| | | | | |
|---|---|---|---|---|
| 4,289,061 A | * | 9/1981 | Emmett | ............ 411/34 |
| 4,732,519 A | * | 3/1988 | Wagner | ............ 411/337 |
| 5,635,675 A | | 6/1997 | Houga | |
| 6,516,602 B2 | | 2/2003 | Sakai et al. | |
| 6,725,642 B2 | | 4/2004 | Tsutsumi et al. | |
| 6,745,555 B2 | | 6/2004 | Hermey et al. | |
| 6,860,686 B2 | * | 3/2005 | Schneider | ............ 411/34 |
| 6,984,782 B2 | | 1/2006 | Ikeda et al. | |
| 7,086,688 B2 | * | 8/2006 | Edwards | ............ 296/181.3 |
| 7,204,075 B2 | | 4/2007 | Utaki | |
| 7,317,160 B2 | | 1/2008 | Utaki | |
| 7,406,819 B2 | * | 8/2008 | Utaki et al. | ............ 59/78.1 |
| 7,513,096 B2 | * | 4/2009 | Utaki et al. | ............ 59/78.1 |
| 2003/0182924 A1 | | 10/2003 | Tsutsumi et al. | |
| 2007/0163795 A1 | | 7/2007 | Utaki | |
| 2007/0170305 A1 | | 7/2007 | Utaki | |
| 2007/0218829 A1 | | 9/2007 | Utaki | |
| 2007/0228227 A1 | | 10/2007 | Utaki | |
| 2007/0241239 A1 | | 10/2007 | Utaki | |

FOREIGN PATENT DOCUMENTS

DE          4313082          11/1994

* cited by examiner

*Primary Examiner* — Tan Le
(74) *Attorney, Agent, or Firm* — Woodling, Krost and Rust

(57) ABSTRACT

A cable protection and guide device in which wear damage in mounting portions of a mounting bracket is avoided and the mounting bracket is reliably and strongly mounted so that the cable is smoothly protected and guided. The mounting operation of the bracket is easy. A cable protection and guide device includes a mounting bracket having a mounting hole which surrounds and accommodates a tap bolt. A threaded portion 162 of the tap bolt includes a metallic bush 170 and the length H1 of the metallic bush 170 in a bolt inserting direction is shorter than the length H2 of the mounting hole 143 in a bolt inserting direction.

4 Claims, 6 Drawing Sheets

CABLE PROTECTION AND GUIDE DEVICE

TECHNICAL FIELD

The present invention relates to a cable or the like protection and guide device. More specifically, the invention relates to a cable or the like protection and guide device suitable for accommodating a cable or the like (such as a cable (cables) or a hose (hoses)) which supplies a movable member of an industrial machine with electric power or energy of compressed air. The device safely and reliably guides and protects a cable (cables) or the like even during movement of the movable portion.

BACKGROUND TECHNOLOGY

A conventional cable or the like protection and guide device such as the cable/hose protection and guide chain 500 is known. A mounting bracket 540 made of a synthetic resin is connected to mounting fixed ends and mounting movable ends of a number of connected pairs of right and left synthetic resin link plates. The plates include mounting holes 543 which surround and accommodate a tap bolt 560, inserted metallic bush 570, and mounting brackets screwed by tap bolts through the mounting hole 543, a fixing member and a movable member. See, Patent Reference 1, German Patent Specification No. 4313082.

Problems to be Solved by the Invention

However, since in such a protection and guide chain 500, as shown in FIG. 9, the length H1 of the metallic bush 570 in a bolt inserting direction is longer than the length H2 of the mounting hole 543 in a bolt inserting direction. If the mounting bracket 540 is mounted (screwed into) onto a fixed member and a movable member using tap bolts 560, the tap bolt 560 presses against only the metallic bush 570 without pressing the mounting bracket 540. The bracket 540 can move vertically and can pivot so that it cannot be reliably fixed. Thus the cable accommodating space exhibits snaking movements and a cable (cables) or the like C cannot be smoothly protected or guided. Additionally, wear damage occurs due to friction between the mounted portions resulting in short life for the guide chain 500.

Accordingly, an object of the present invention is to solve the above-described problems. The cable protection and guide device of the present invention prevents wear damage in mounting portions of the mounting bracket. The mounting bracket is reliably and strongly mounted so that a cable is smoothly protected and guided. The assembly of the mounting bracket is easy.

Means for Solving the Problems

The invention attains the above-mentioned object by providing a cable protection and guide device which protects and guides a cable wherein mounting brackets of a synthetic resin are connected to a mounting fixed end side and a mounting movable end side. A cable accommodating space is formed by a number of side plate units and connecting plates. The mounting brackets are screwed to fixing members and movable members by tap bolts. The mounting bracket includes a mounting hole which surrounds and accommodates the tap bolt-inserted metallic bush. The length of the metallic bush in a bolt inserting direction is shorter than the length of the mounting hole in a bolt inserting direction.

The invention further attains the above-mentioned object in that the difference between the length of the metallic bush in a bolt inserting direction and the length of the mounting hole in a bolt inserting direction is set within a range of elastic deformation of the synthetic resin forming the mounting bracket.

The invention further attains the above-mentioned object in that the mounting hole of the mounting bracket is formed of a tapered inner circumferential surface which engages the metallic bush.

Effects of the Invention

Mounting brackets made of a synthetic resin are connected to a mounting fixed end side and a mounting movable end side to form a cable accommodating space surrounded by a number of side plate units and connecting plates. The connecting plates are respectively screwed to fixing members with tap bolts and movable members which protect and guide a cable. A cable or the like is accommodated in a cable accommodating space surrounded by a number of side plate units and connecting plates from the mounting fixed end toward the mounting movable end.

The mounting bracket includes a mounting hole which surrounds and accommodates the tap bolt-inserted metallic bush. The cable or the like protection and guide device is screwed to a fixed member or a movable member. The mounting hole of a mounting bracket through which a tap bolt is inserted is strengthened and protected by a metallic bush. Thus, even if the tap bolt is screwed into the fixed member or the movable member, breakage (i.e., a crack) in the mounting hole of the mounting bracket does not result and strong fastening force can be exhibited.

Since the length of the metallic bush in a bolt inserting direction is shorter than the length of the mounting hole in a bolt inserting direction and the cable or the like protection and guide device is screwed to the fixed member or the movable member, the tap bolt reliably restricts the vertical movement and pivoting of a synthetic resin mounting bracket and can fasten the mounting bracket while pressing the metallic bush in a contact state with the mounting bracket. Additionally, since the tap bolt deformation is decreased in the mounting hole of the synthetic resin mounting bracket, even if there is a radial gap between the mounting hole of the mounting bracket and the metallic bush, both elements mutually exhibit a close contact state so that reliable fastening is accomplished. Even if there are some diametrical variations of the mounting holes formed in the mounting brackets and outer diameters of the metallic bushes, the variations can be tolerated. Therefore, the mounting operation is easily accomplished.

According to the invention, since a difference between the length of the metallic bush in a bolt inserting direction and the length of the mounting hole in a bolt inserting, direction is set within a range of elastic deformation of the synthetic resin forming the mounting bracket, when the mounting bracket of the cable or the like protection and guide device is screwed to a fixed member or a movable member, the tap bolt fastens the metallic bush while elastically deforming the mounting bracket by a differential part of the length in a bolt inserting direction and internal stress of the mounting bracket, which is generated when such elastic deformation is used as fastening force, is absorbed within a range of elastic deformation of the synthetic resin. Thus even if the tap bolt is strongly fastened to the fixed member or the movable member, a breakage such as a crack or the like cannot be generated so that strong fastening force is exhibited for a long period of time.

According to the invention, since the mounting hole of the mounting bracket is formed of a tapered inner circumferential surface which engages with the metallic bush, when the mounting bracket of the cable or the like protection and guide device is screwed to the fixed member or the movable member, the metallic bush can be press-fit into a tapered inner circumferential surface formed in the mounting hole of the mounting bracket using a slight pressing force, and at the same time the tap bolt can be screwed while temporarily engaging the metallic bush with the tapered inner circumferential surface of the mounting bracket and integrating the metallic bush without dropping it. And even if there are some size variations in the diameters of the mounting holes formed in the mounting brackets and outer diameters of the metallic bushes, the different sizes can be perfectly allowed by the tapered inner circumferential surface. Therefore, the mounting operation can be more easily attained.

Wear damage in a mounting portion of the mounting bracket is avoided and the mounting bracket is reliably and strongly mounted so that a cable or the like is smoothly protected and guided. The mounting operation is simplified by a cable or the like protection and guide device which protects and guides a cable or the like. Mounting brackets of a synthetic resin are connected to a mounting fixed end side and a mounting movable end side. A cable accommodating space surrounded by a number of side plate units and connecting plates are respectively screwed to fixing members and movable members by tap bolts. Mounting brackets include a mounting hole which surround and accommodate the tap bolt-inserted metallic bush. The length of the metallic bush in a bolt inserting direction is shorter than the length of the mounting bolt in a bolt inserting direction.

Engineering plastic resins such as polyamide 6, polyamide 12, polyamide 46, polyamide 66, acryl, polyacetal and the like may be used as materials of the side plate unit, the connecting plate and the mounting bracket used in the cable or the like protection and guide device of the present invention. These materials resist flexion strain liable to occur during a flexional operation so that excellent dimensional stability of the device and the cable accommodating space is exhibited. Particularly, when the above-mentioned members such as the side plate unit and the connecting plate are molded by use of a fatigue resistant resin material of an elastomer or rubber component-formulated polyamide resin or polybutylene terephthalate, since the elastomer or rubber component-formulated polyamide resin or polybutylene terephthalate adds flexibility and which is strong to impact resistance, the device exhibits excellent fatigue resistance to repeated flexions. Use of the elastomer or rubber component-formulated polyamide resin or polybutylene terephthalate is more preferred.

A number of pairs of right and left side plate units used in the cable or the like protection and guide device according to the present invention are connected to each other in a longitudinal direction of the device and form a cable accommodating space together with connecting plates respectively bridged over on a flexional inner circumferential side and a flexional outer circumferential side.

A side plate form, which has been known in Japanese Laid-Open Patent Publication No. 2004-297856, Japanese Laid-Open Patent Publication No. 2005-061554 or the like, may be used in which the side plate unit is integrally formed in an oval type by a side plate front portion connected to a known preceding side plate unit and a side plate rear portion connected to a subsequent side plate, and a connecting pin mechanism, which connects side plate units to each other to pivot. The plates are offset-disposed between a side plate rear portion of a preceding side plate unit and a side plate front portion of a side plate subsequent to this side plate rear portion.

Alternatively, a side plate form which has been filed as Japanese Patent Application No. 2006-112087 and Japanese Patent Application No. 2006-069527, may be used in which the side plate unit is integrally formed of a side plate front portion connected to a preceding side plate unit, a side plate rear portion connected to a subsequent side plate unit and a flexible coupling portion integrally intervened between the side plate front portion and the side plate rear portion and a snap-fit mechanism connecting the side plate units to each other is provided between a side plate rear portion of the preceding side plate unit and a side plate front portion of the subsequent side plate unit. In the latter case, an inadvertent disengagement of the side plate unit in a coupling portion due to repeated bending is avoided and a load liable to be generated in a bent portion during a bending position restriction is also avoided so that excellent durability can be exhibited. The number of parts necessary and the assembly operation can be reduced. Maintenance at the time of connection and disconnection of the side plate units is easy.

Connecting plates used in the cable or the like protection and guide device according to the present invention are detachably bridged over the flexional inner circumferential side and the flexional outer circumferential side of the side plate units. The connecting plates may be bridged over every side plate unit or intermittently in the longitudinal direction.

With a mounting hole of the mounting bracket used in the cable or the like protection and guide device according to the present invention, at least one mounting hole with respect to one mounting bracket may be used. However, front and rear mounting holes are preferable and a stable mounting state is achieved in the mounting bracket width direction. A tapered inner circumferential surface forming the mounting hole may be formed from either the direction of the upper and lower side and the mounting hole may be provided in a part of a plate thickness of the mounting bracket or in the entire portion of the mounting bracket.

DESCRIPTION OF THE INVENTION

Example

A cable or the like protection and guide device, which is an example of the present invention, will be described in detail by use of FIGS. 1 to 8.

Figure 1:
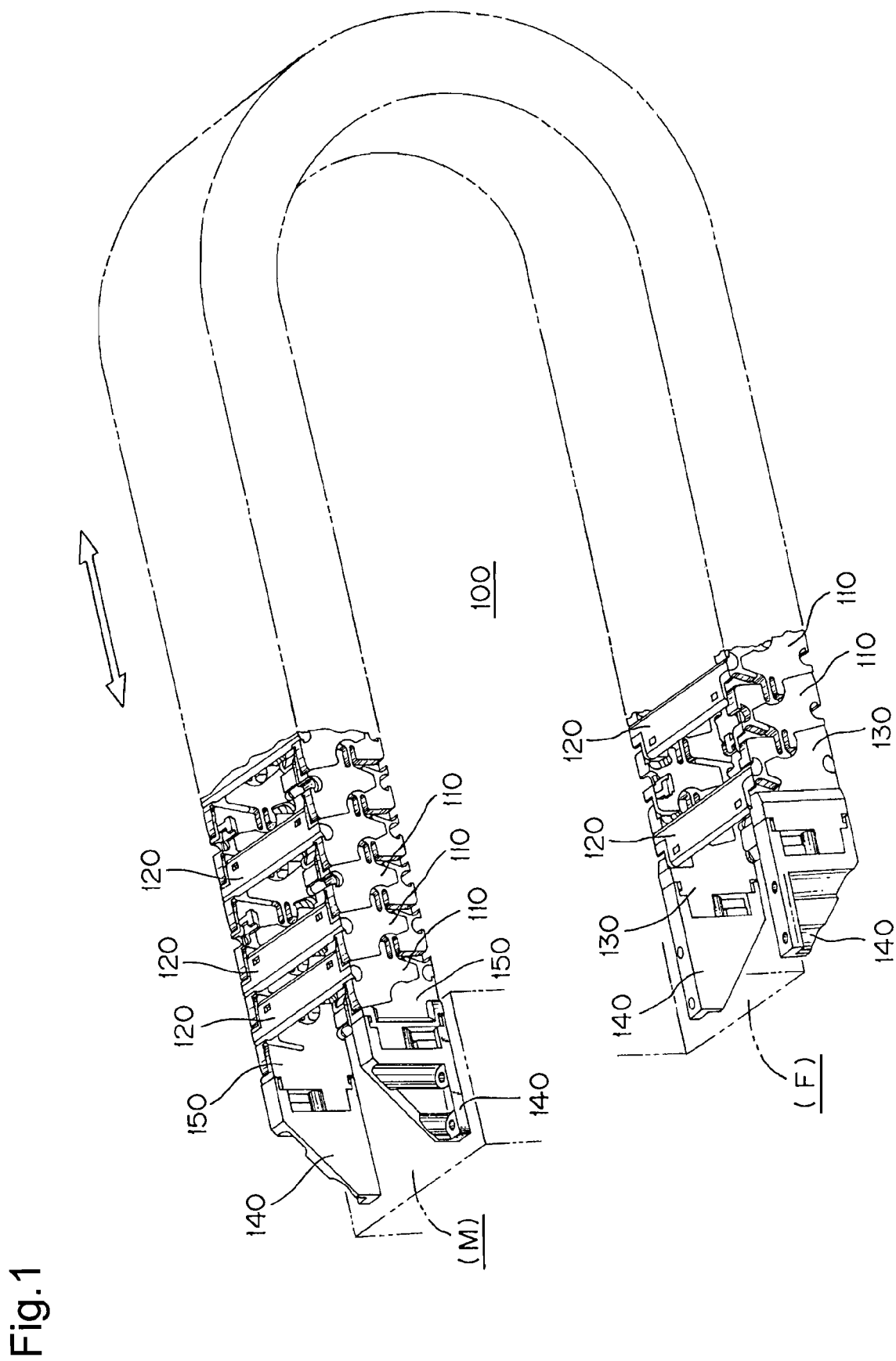
FIG. 1 is an example showing a use of the cable or the like protection and guide device.
Figure 2:
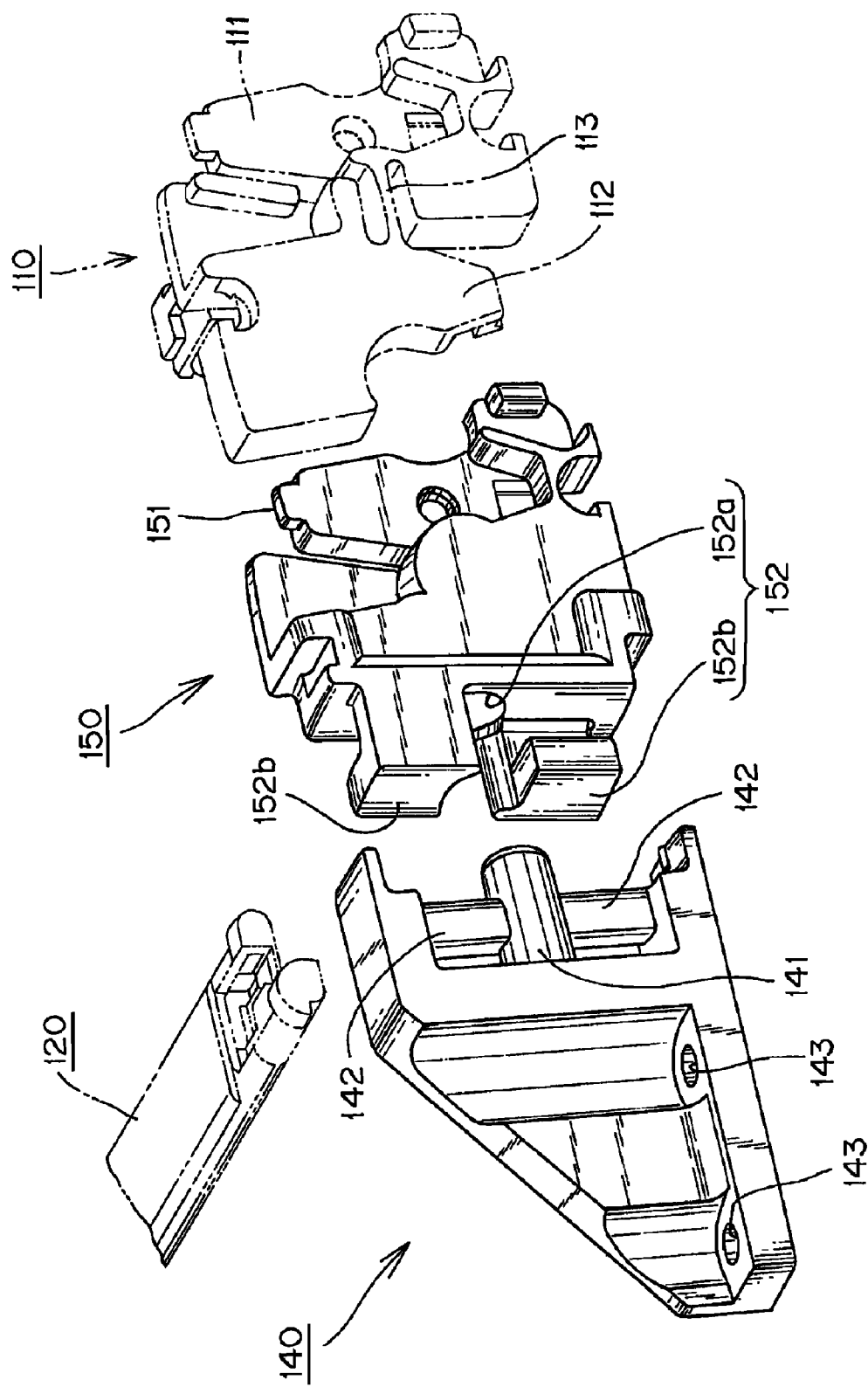
FIG. 2 is an exploded view of a mounting movable end side viewed from the outside of the cable or the like protection and guide device shown in FIG. 1.
Figure 3:
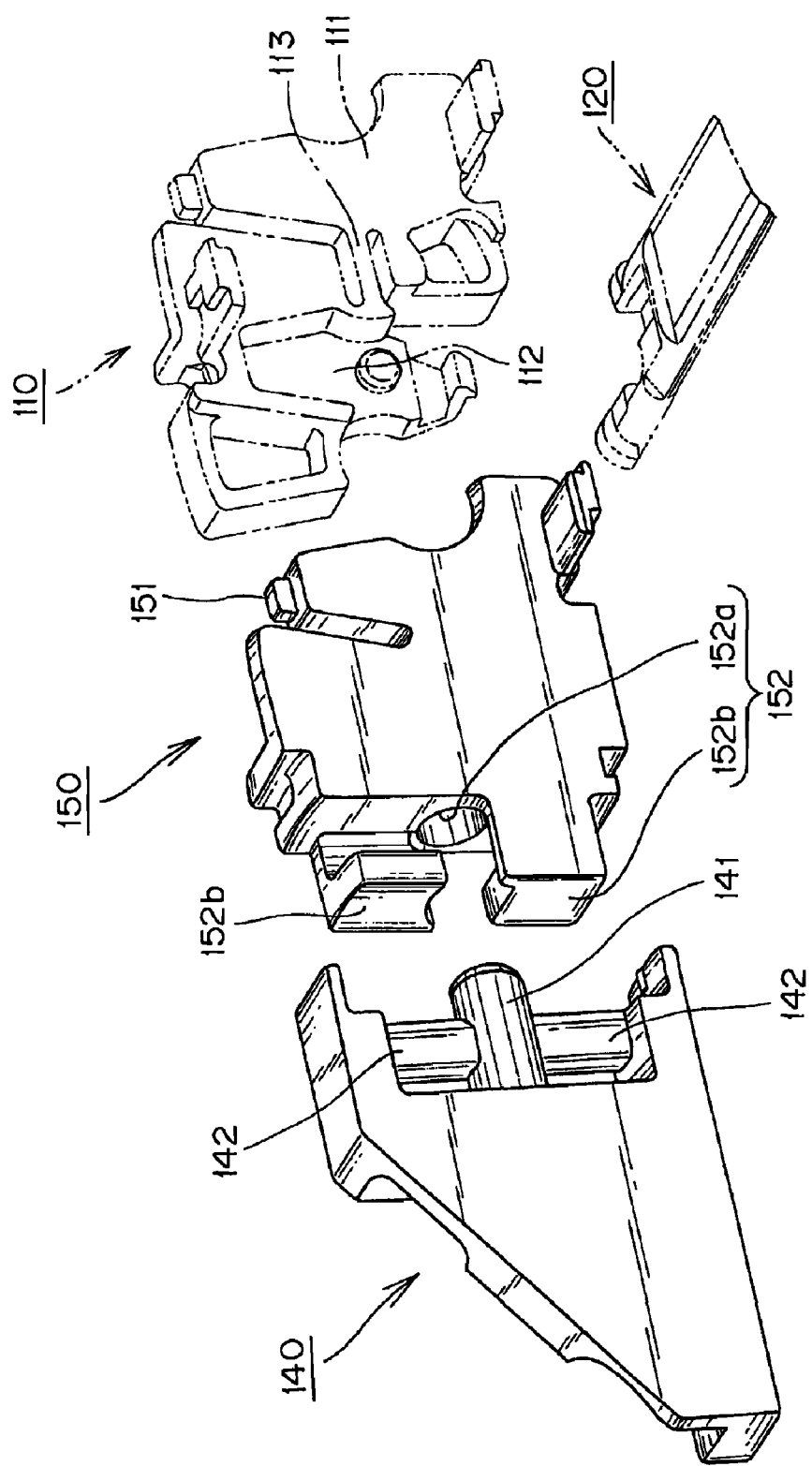
FIG. 3 is an exploded view of a mounting movable end side viewed from the inside of the cable or the like protection and guide device shown in FIG. 1.
Figure 4:
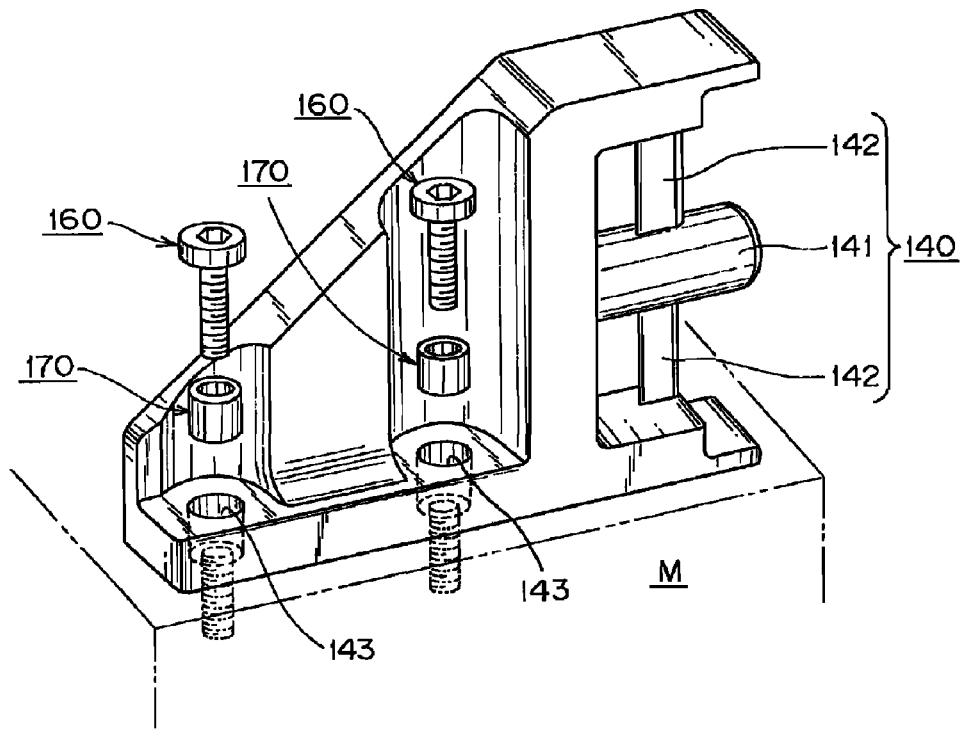
FIG. 4 is a perspective view showing a mounting bracket mounted state.
Figure 5:
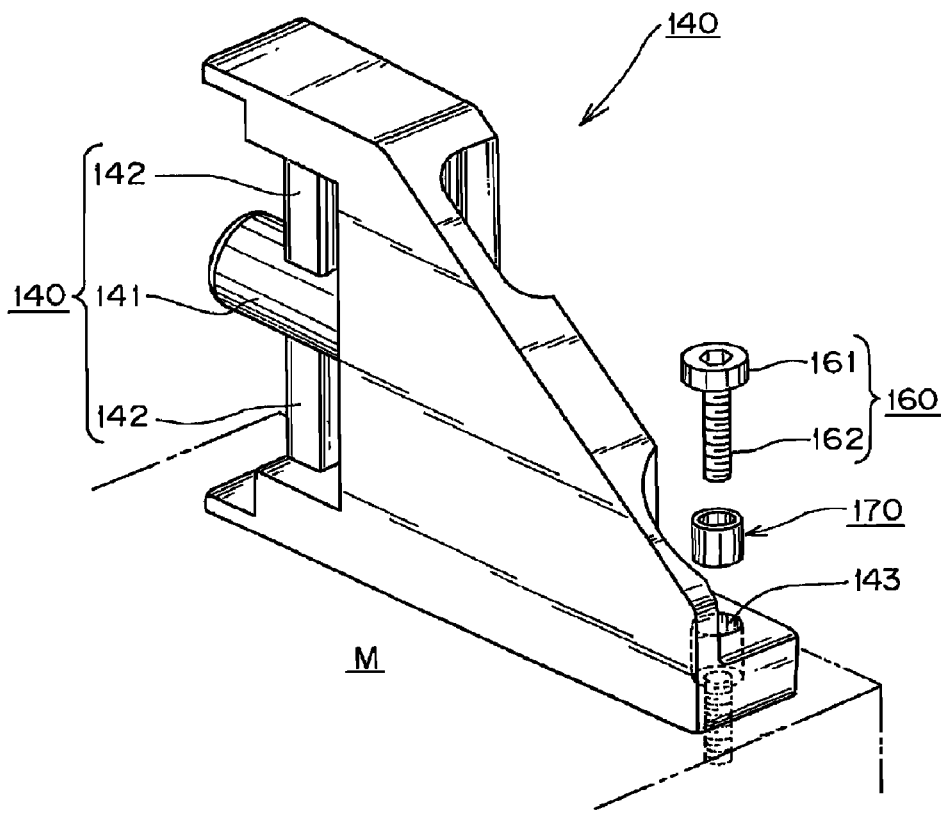
FIG. 5 is a perspective view showing the mounting bracket mounted view viewed from the back side of FIG. 4.
Figure 6:
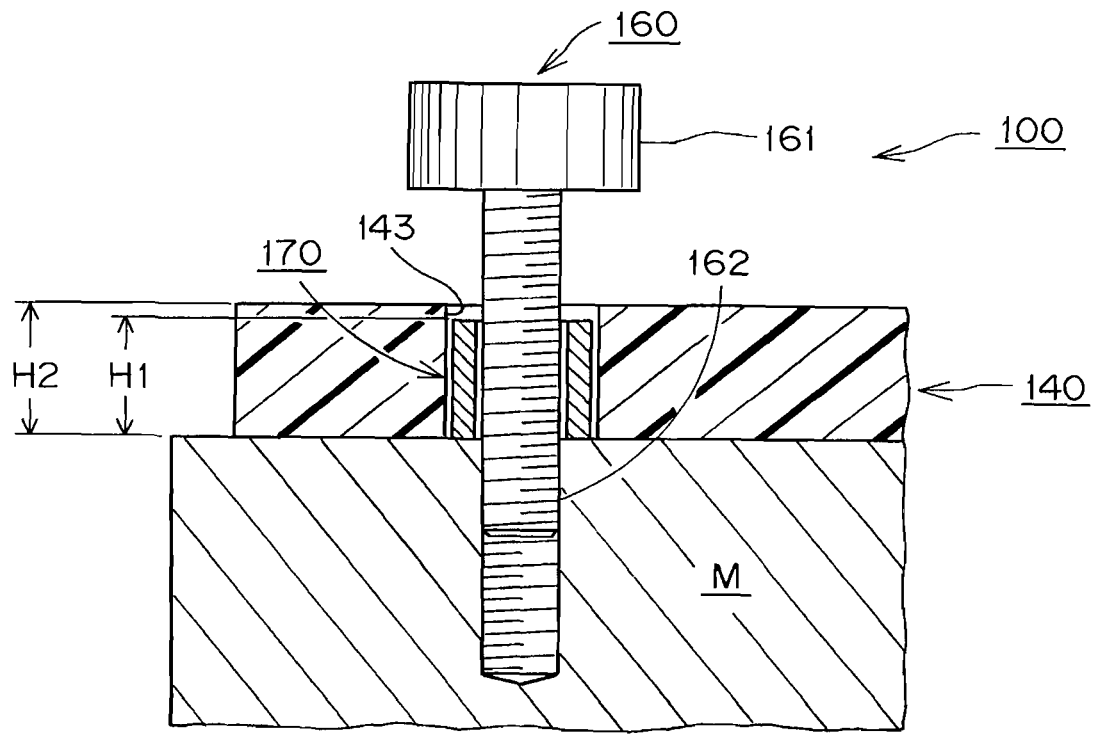
FIG. 6 is an explanatory view showing a starting state of screwing of a tap bolt.
Figure 7:
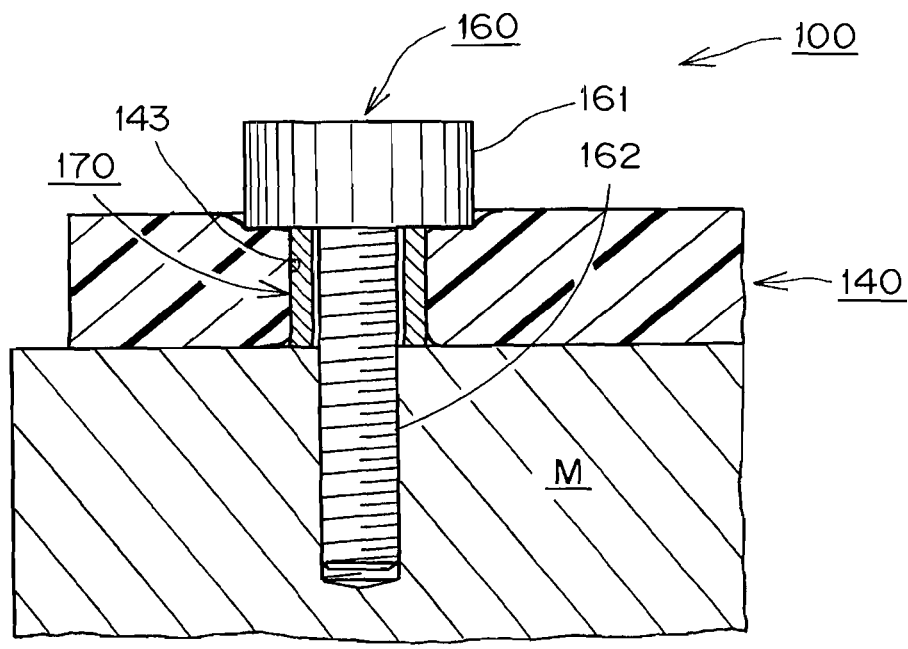
FIG. 7 is an explanatory view showing a fastened state of the tap bolt.
Figure 8:
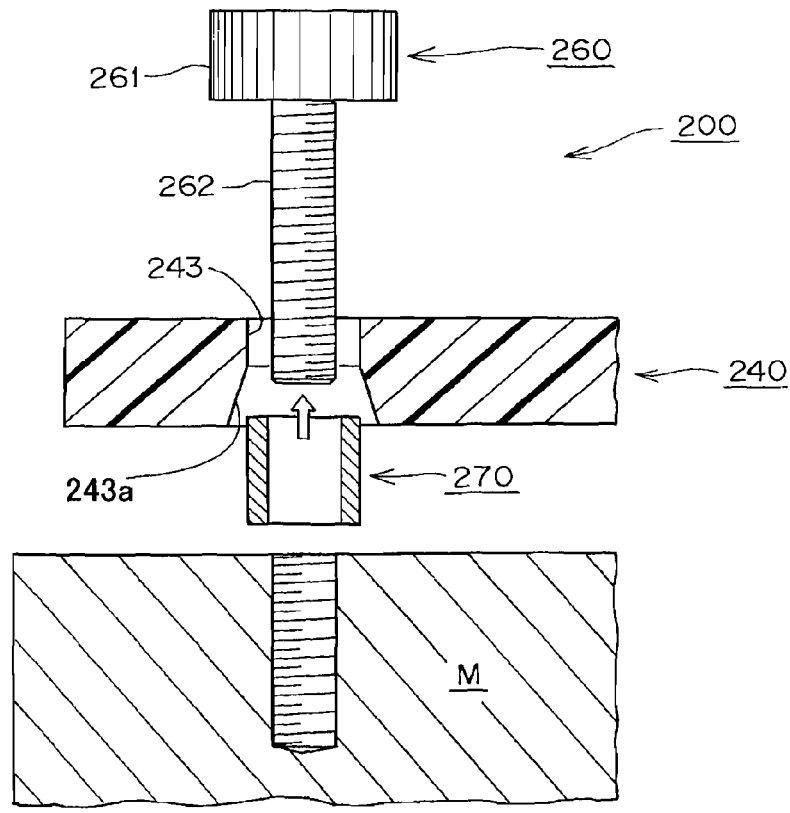
FIG. 8 is an explanatory view showing a state just before screwing of the tap bolt in the second example of the present invention.
Figure 9:
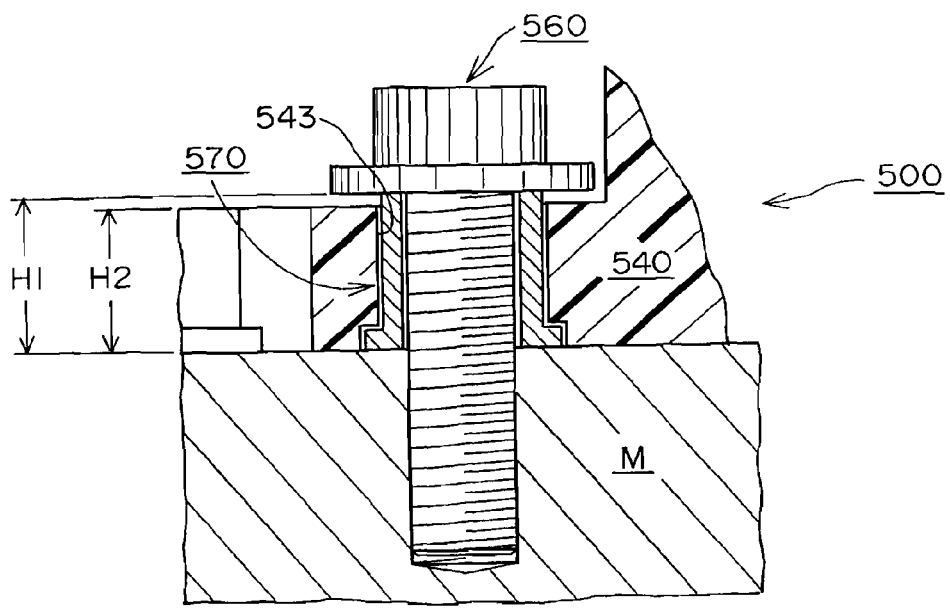
FIG. 9 is an explanatory view showing a conventional tap bolt clamped state.

Here, FIG. 1 is the whole view showing a use of the cable or the like protection and guide device, which is the first example of the present invention, FIG. 2 is an exploded view of a mounting movable end side viewed from the outside of the cable or the like protection and guide device shown in FIG. 1. FIG. 3 is an exploded view of a mounting movable end side viewed from the inside of the cable or the like protection and guide device shown in FIG. 1. FIG. 4 is a perspective view showing a mounting bracket mounted state. FIG. 5 is a perspective view showing the mounting bracket mounted state of viewed from the back side of FIG. 4. FIG. 6 is an explanatory view showing a starting state of screwing of a tap bolt. FIG. 7 is an explanatory view showing a fastened state of the tap bolt. FIG. 8 is an explanatory view showing a state just before screwing of the tap bolt in the second example of the present invention.

The cable or the like protection and guide device 100 is an example of the present invention and is used for protecting and guiding cables or the like C such as electric cables which connect between a movable portion and a stationary portion in a semiconductor device, a pharmacy development sample storage device, a door opening/closing device for a vehicle or the like to carry out transmission of electric signals and supply of electric power, and hoses, which supply pressure liquid or pressure gas. The cable or the like protection and guide device is longitudinally connected to connect between the movable portion and the stationary portion (not shown). The cable or the like protection and guide device 100 exhibits a linear position or a flexional position in accordance with movement between the movable portion and the stationary portion.

As shown in FIG. 1, the cable or the like protection and guide device 100 is formed in such a manner that a number of right and left pairs of spaced side plate units 110, 110 are connected to each other in a longitudinal direction of the cable from a mounting fixed end side (F) attached to the above-mentioned stationary member toward a mounting movable end side (M) attached to the movable member. Connecting plates 120 are respectively bridged over flexional inner circumferential sides and flexional outer circumferential sides of these side plate units 110, 110 with alternate arrangement intervals of the side plate units 110, 110 connected to each other in a large number. The cable (cables) or the like C is/are accommodated in a cable accommodating space with a rectangular section formed by the right and left pairs of side plate units 110, 110 and the connecting plates 120, 120 along the longitudinal direction.

It is noted that although in the cable or the like protection and guide device 100 of this example, the connecting plates 120 are bridged in alternate arrangement intervals with respect to the side plate units 110, 110 connected to each other in a large number, for example, they may be bridged over each of the respective side plate units 110 in a 1 to 1 correspondence.

Further, as shown in FIG. 1, a pair of right and left mounting brackets 140, 140 are detachably connected to a pair of right and left side plate units 110, 110 adjacent to the mounting fixed end side (F) through a pair of right and left fixed end side adaptors 130, 130. A pair of right and left mounting brackets 140, 140 are detachably connected to a pair of right and left side plate units 110, 110 adjacent to the mounting movable end side (M) through a pair of right and left movable end side adaptors 150, 150, respectively.

As shown in FIGS. 1 to 3, the pair of right and left spaced side plate units 110, 110 are molded by use of a fatigue resistant resin material of a rubber component-formulated polyamide resin.

And the side plate unit 110 is integrally composed of a side plate front portion 111 connected to a preceding side plate unit 110, a side plate rear portion 112 connected to the subsequent side plate unit 110 and a flexible coupling portion 113 integrally intervened between these side plate front portion 111 and the side plate rear portion 112.

The coupling portion 113 is composed of a fatigue resistant polyamide rubber composition and is flexibly adapted to repeated flexions. The cable or the like protection and guide device 100 exhibits excellent fatigue resistance to repeated flexions. And at the same time since the side plate front portion 111 and the side plate rear portion 112 concentrate flexion strain liable to occur during a flexional operation in the coupling portion 113 to absorb it, so that the cable or the like protection and guide device 100 exhibits excellent stability of a cable holding form. As a result the linear position or bending position can be reliably held.

Next, a mounting structure of a mounting fixed end side and a mounting movable end side which is an important feature in the cable or the like protection and guide device 100 of this example, will be described in detail hereinbelow with reference to FIGS. 4 to 7.

First, the connecting structure of the above-described mounting fixed end side or the mounting movable end side is such that, as shown in FIGS. 2 and 3, a pair of right and left mounting brackets 140, 140 are detachably connected to a pair of right and left side plate units 110, 110 in the vicinity of the mounting fixed end side (F) or the mounting movable end side (M) through a pair of right and left fixed end side adaptors 130, 130 or movable end side adaptors 150, 150, respectively.

The pair of right and left brackets 140 each include a turnover shaft 141 which engages with a shaft hole 152a formed in a bracket side connecting portion 152 of the movable end side adaptor 150. The pair of right and left brackets 140 each include an engagement post 142 which engages with a holding arm 152b formed in a bracket side connecting portion 152 of the movable end side adaptor 150. The shafts and posts of the brackets arms are adapted to engage with the movable end side adaptor 150 and the fixed end side adaptor 130.

It is noted that the reference numeral 151 in FIGS. 2 and 3 denotes a unit side connecting portion of the movable end side adaptor 150.

Further, the mounting bracket 140 is molded by use of a fatigue resistant resin material of a rubber component-formulated polyamide resin, and for example, the mounting bracket 140 is, as shown in FIGS. 4 and 5, is screwed to a movable member of the mounting movable end side (M) by a tap bolt 160 having a circular bolt head portion 161.

It is noted that a hexagon wrench hole is provided in the bolt head portion 161 of the tap bolt 160 as shown in FIGS. 4 and 5, and the tap bolt can be clamped by use of a hexagon wrench not shown. However, the bolt head portion 161 of the tap bolt 160 may be formed in other shapes if desired.

Mounting bracket 140 includes a mounting hole 143 which surrounds and accommodates a metallic bush 170 through which a threaded portion 162 of the above-mentioned tap bolt 160 is inserted.

Accordingly, when the mounting bracket 140 is fixedly screwed to the movable member as shown in FIG. 6 the mounting hole 143 of the mounting bracket 140 through which the threaded portion 162 of the tap bolt is inserted, is reinforced and protected by the metallic bush 170. Even if the tap bolt 160 is clamped to the movable member a breakage such as a crack or the like is not generated in the mounting hole 143 of the mounting bracket 140 and strong fastening force can be exhibited.

It is noted that the mounting holes 143 are provided at two front and rear positions in a longitudinal direction of the mounting bracket 140 and assume a stable mounted state without moving around in the width direction of the mounting bracket 140.

Since the length H1 of the metallic bush 170 in a bolt inserting direction is shorter than the length of the mounting hole 143 in a bolt inserting direction, when the mounting bracket 140 is screwed to a movable member, the tap bolt 160 reliably restricts the vertical movement and pivoting of a fatigue resistant resin material mounting bracket 140 and can fasten the mounting bracket 140 while pressing the metallic bush 170 in a contact state with the mounting bracket 140, as shown in FIG. 7. Additionally, since the tap bolt 160 deforms the mounting hole 143 of the fatigue resistant resin material mounting bracket 140 as illustrated in FIG. 7, even if there is a radial gap between the mounting hole 143 of the mounting bracket 140 and the metallic bush 170, both elements mutually exhibit a close contact state so that a reliable fastening can be made. Even if there are some diametrical size variations in the mounting holes formed in the mounting brackets 140 and outer diameters of the metallic bushes 170, the size variations can be tolerated.

The difference between the length H1 of the metallic bush 170 in a bolt inserting direction and the length H2 of the mounting hole 143 in a bolt inserting direction is set within a range of elastic deformation of the fatigue resistant resin material forming the mounting bracket 140. When the mounting bracket 140 is screwed to a fixed member or a movable member, the tap bolt 160 fastens the metallic bush 170 while elastically deforming the mounting bracket 140. The differential length in a bolt inserting direction and an internal stress of the mounting bracket 140 which is generated by the elastic deformation is absorbed within a range of elastic deformation of the fatigue resistant resin material. Thus even if the tap bolt 160 is strongly fastened to the fixed member or the movable member a breakage such as a crack or the like is not generated so that strong fastening force can be exhibited for a long period of time.

It is noted that a mounting form of the mounting bracket 140 in this example has been explained by showing a mounting movable end side of the cable or the like protection and guide device 100 with reference to FIGS. 4 to 7. However, even if a mounting fixed end side of the cable or the like protection and guide device 100 is used as the mounting form of the mounting bracket 140 in place of the mounting movable end side, as shown in FIG. 1, a mounting direction is not changed at all except that the mounting bracket 140 is only reversed. It is noted that the mounting fixed end side is mounted by use of the tap bolt 160 and the metallic bush 170 as in the mounting movable end side.

In the thus obtained cable or the like protection and guide device 100 of the above-described example, the mounting brackets 140 of a fatigue resistant resin material are connected to a mounting fixed end side and a mounting movable end side for a cable accommodating space R surrounded by a number of side plate units 110. Mounting brackets are respectively screwed to fixing members and movable members by tap bolts 160. The mounting bracket 140 includes a mounting hole 143 which surrounds and accommodates the tap bolt 160 and inserted metallic bush 170. The length H1 of the metallic bush 170 in a bolt inserting direction is shorter than the length H2 of the mounting hole 143 in a bolt inserting direction. Wear damage in the mounting portion of the mounting bracket 140 is avoided and the mounting bracket 140 is reliably and strongly mounted so that a cable (cables) or the like C is smoothly protected and guided and the mounting operation becomes simple. Thus the effects of this example are very large.

In a cable or the like protection and guide device, which is the second example according to the present invention shown in FIG. 8, mounting brackets 240 of a fatigue resistant resin material are connected to a mounting fixed end side and a mounting movable end side. Brackets 240 are screwed to fixing members and movable members by tap bolts 260. The mounting bracket 240 includes a mounting hole 243 which surrounds and accommodates a tap bolt-inserted metallic bush 270. The length H1 of the metallic bush 270 in a bolt inserting direction is shorter than the length H2 of the mounting hole 243 in a bolt inserting direction as in the above-mentioned cable or the like protection and guide device 100.

It is noted that the mounting holes 243 are provided at two front and rear positions in a longitudinal direction of the mounting bracket 240 and assume a stable mounted state without moving around in the width direction of the mounting bracket 240.

The cable or the like protection and guide device 200 of such second example, in addition to the configuration of the above-described cable or the like protection and guide device 100, as shown in FIG. 8 the mounting hole 243 of the mounting bracket 240 is formed of a tapered inner circumferential surface 243a which surrounds and engages the metallic bush 270.

It is noted that the tapered inner circumferential surface 243a forms a portion of the mounting hole 243 and opens in the downward direction of the mounting bracket 240.

Therefore, in the thus obtained cable or the like protection and guide device 200 of the second example, when the mounting bracket 240 is screwed to the fixed member or the movable member, the metallic bush 270 can be press-fit into the tapered inner circumferential surface 243a formed in the mounting hole 243 of the mounting bracket 240 by using a slight pressing force. At the same time the tap bolt 260 can be screwed while temporarily engaging the metallic bush 270 with the tapered inner circumferential surface 243a of the mounting bracket 240 and integrating the metallic bush 270 without dropping it. Even if there are some size variations in the diameter of the mounting holes 243 formed in the mounting brackets 240 and outer diameters of the metallic bushes 270, the size variations or errors can be perfectly allowed by the tapered inner circumferential surface 243a. Therefore, the mounting operation can be easily accomplished. Thus the effects of the second example are very large.

DESCRIPTION OF REFERENCE NUMERALS 100, 200 . . . Cable or the like protection and guide device
110 . . . Side plate unit
111 . . . Side plate front portion
112 . . . Side plate rear portion
113 . . . Coupling portion
120 . . . Connecting plate
130 . . . Fixed end side adaptor
140 . . . Mounting bracket
141 . . . Turnover shaft
142 . . . Engagement post
143, 243 . . . Mounting hole 243a . . . Tapered inner circumferential surface
150 . . . Movable end side adaptor
151 . . . Unit side connecting portion
152 . . . Bracket side connecting portion
152a . . . Holding arm
160, 260 . . . Tap bolt
161 . . . Bolt head portion
162 . . . Thread portion
170, 270 . . . Metallic bush
500 . . . Cable or the like protection and guide device
540 . . . Mounting bracket
543 . . . Mounting hole
560 . . . Tap bolt
570 . . . Metallic bush
C . . . Cable or the like
R . . . Cable accommodating space
H1 . . . Length of metallic bush in a bolt inserting direction
H2 . . . Length of mounting hole a bolt inserting direction

The invention claimed is:

1. A cable protection and guide device which protects and guides a cable, comprising:
    mounting brackets, said mounting brackets are made of elastically deformable synthetic resin;
    said device includes a fixed end side and a movable end side;
    said fixed end side includes threaded holes therein;
    said movable end side includes threaded holes therein;
    tap bolts;
    a number of side plate units and a number of connecting plate units form a cable accommodating space, said cable residing substantially within said cable accommodating space;
    each of said mounting brackets includes a mounting hole therethrough, each of said mounting holes having a first length and a first diameter;
    each mounting hole includes a metallic bush residing therein, each said metallic bush having a second length, and, each said metallic bush having a second diameter;
    said second length of each said metallic bush being less than said first length of each said mounting hole;
    said second diameter of said metallic bushes being larger than said first diameter of said mounting holes, said metallic bushes being press-fit into said mounting holes of said mounting brackets elastically deforming said mounting holes;
    said tap bolts extending through said mounting holes of said mounting brackets, said tap bolts extending through said metallic bushes press-fit into said mounting holes of said mounting brackets, said tap bolts are threadedly affixed to said threaded holes of said fixed end side or to said threaded holes of said movable end side thereby affixing each of said mounting brackets to said fixed end side or said movable end side;
    each of said tap bolts include a bolt head portion, said bolt head portions of said tap bolts engage said elastically deformable mounting brackets compressing a portion of said elastically deformable mounting brackets adjacent said bolt head portions of said tap bolts; and,
    each of said bolt head portions of said tap bolts engage each of said metallic bushes when said tap bolts are fully threaded into said threaded holes of said fixed end side or said threaded holes of said movable end side.

2. A cable protection and guide device according to claim 1, wherein the difference between said first length of said mounting holes in said brackets and said second length of said metallic bushes is within the range of elastic deformation of said synthetic resin forming said mounting brackets.

3. A cable protection and guide device according to claim 1 wherein each of said mounting holes of said mounting brackets includes a tapered inner circumferential surface portion and a cylindrical portion, and, said mounting holes surround and engage said metallic bushes.

4. A cable protection and guide device according to claim 2 wherein each of said mounting holes of said mounting brackets includes a tapered inner circumferential surface portion and a cylindrical portion, and, said mounting holes surround and engage said metallic bushes.

* * * * *